(12) United States Patent
Lehmann et al.

(10) Patent No.: US 7,586,077 B2
(45) Date of Patent: Sep. 8, 2009

(54) REFERENCE PIXEL ARRAY WITH VARYING SENSITIVITIES FOR TIME OF FLIGHT (TOF) SENSOR

(75) Inventors: Michael Lehmann, Winterthur (CH); Bernhard Buettgen, Adliswil (CH); Thierry Oggier, Zurich (CH)

(73) Assignee: MESA Imaging AG, Zurich (CH)

( * ) Notice: Subject to any disclaimer, the term of this patent is extended or adjusted under 35 U.S.C. 154(b) by 0 days.

(21) Appl. No.: 12/175,100

(22) Filed: Jul. 17, 2008

(65) Prior Publication Data

US 2009/0020687 A1 Jan. 22, 2009

Related U.S. Application Data

(60) Provisional application No. 60/950,412, filed on Jul. 18, 2007.

(51) Int. Cl.
*H01L 27/00* (2006.01)
(52) U.S. Cl. .................. 250/208.1; 250/214 R
(58) Field of Classification Search .......... 250/208.1, 250/214 R, 559.2, 559.22; 356/489, 495, 356/511
See application file for complete search history.

(56) References Cited

U.S. PATENT DOCUMENTS

| | | | |
|---|---|---|---|
| 5,856,667 A | 1/1999 | Spirig et al. | |
| 6,483,094 B1 | 11/2002 | Yahav et al. | |
| 6,777,659 B1 | 8/2004 | Schwarte | |
| 6,825,455 B1 | 11/2004 | Schwarte | |
| 7,274,467 B2 * | 9/2007 | Doerband et al. | ........... 356/512 |
| 2006/0108611 A1 | 5/2006 | Seitz | |

FOREIGN PATENT DOCUMENTS

| | | |
|---|---|---|
| DE | 44 40 613 C1 | 7/1996 |
| DE | 198 21 974 A1 | 11/1999 |
| GB | 2 389 960 A | 12/2003 |
| WO | 2007/045108 A1 | 4/2007 |

* cited by examiner

*Primary Examiner*—Que T Le
(74) *Attorney, Agent, or Firm*—Houston Eliseeva LLP (57) ABSTRACT

The sensitivity of a reference pixel array RPA to the reference modulated light MLR is varied for different reference pixels RP of the reference pixel array RPA. In one embodiment the different sensitivities of the reference pixels RP in the RPA is achieved by designing the pixels to have different light sensitivities with respect to each other. In another embodiment, the different sensitivities are achieved by changing optical coupling between the separate reference pixels RP of the reference pixel array RPA to the reference modulated light MLR such as by changing how the different reference pixels RP couple to the aperture LGA of the light guide LG.

20 Claims, 5 Drawing Sheets

REFERENCE PIXEL ARRAY WITH VARYING SENSITIVITIES FOR TIME OF FLIGHT (TOF) SENSOR

RELATED APPLICATIONS

This application claims the benefit under 35 USC 119(e) of U.S. Provisional Application No. 60/950,412, filed on Jul. 18, 2007, which is incorporated herein by reference in its entirety.

BACKGROUND OF THE INVENTION

Time of flight (TOF) sensors typically utilize charge-coupled device (CCD) or complementary metal oxide semiconductor (CMOS) based technologies that are able to sample at high speed. The typical application is for point distance sensing or three-dimensional (3D) imaging in which the scene of interest is actively illuminated with modulated illuminating radiation and the sensor sampling is performed synchronously with the illuminating radiation. High speed sensors are also useful in other applications such as fluorescence lifetime imaging.

Generally, in these sensors light is converted into electrical charge carriers, usually electrons, but holes could also be used, in a photosensitive region. Drift fields are created in this region to transfer the charge carriers to one or more integration gates where the charge is stored until a readout stage. In the typical example, specific integration gates are assigned to different phases within the period of the stimulation radiation and the drift fields are modulated synchronously with the simulation radiation in order to move the charge carriers from the photosensitive region to the integration gates for the phase assigned to that gate.

An early example of a TOF sensor was disclosed in the German patent DE4440613C1 (Spirig, "Vorrichtung und Verfahren zur Detektion eines intensitätsmodulierten Strahlungsfeldes", 1996). See also U.S. Pat. No. 5,856,667. A demodulation device is presented that samples the impinging optical sinusoidally-modulated light signal n times. Charge coupled devices are used for the detection of the light signal and the subsequent transport of the photo-generated charges.

Later, German patent application DE19821974A1 (Schwarte, Vorrichtung und Verfahren zur Erfassung von Phase und Amplitude elektromagnetischer Wellen, 1999), see also U.S. Pat. No. 6,825,455 B1, disclosed a photon-mixing element for a TOF sensor. In order to get a pixel with high-sensitivity and high-speed demodulation facility, a combined structure of stripe-like elements, each of them with short transport paths, is proposed. Nevertheless, the stripe-like structure leads to a poor fill-factor because the regions between the stripes are not photo-sensitive.

Another approach for large-area demodulation pixel for a TOF sensor with high sensitivity and high demodulation speed is given in the English patent application GB2389960A (Seitz, "Four-tap demodulation pixel", 2003). See also US. Pat. Publ. No. US 2006/0108611 A1. A high-resistive photogate of rectangular shape and large size generates a drift-field within the semiconductor substrate enforcing the photo-generated charges to drift to the particular sampling node. Here, any delay of the sampling signal arising on the photo-gate due to large resistance-capacitance (RC) times can reduce the performance of such demodulation pixels. In particular, high frequencies are difficult to realize when many pixels are controlled at the same time. Then the external electronics and their limited driving capability of large capacitances represent the constraining factor.

All pixel structures mentioned above have a common property that the lateral conduction of the photogenerated charges into a specific direction is always related to the push-pull signal on a gate structure spanning the photosensitive photodetection area of the pixel. In order to get higher sensitivities, the photodetection area has to be enlarged, this results in either increased parasitic capacitances that have to be switched or longer transport paths. Both aspects are undesirable because they detrimentally impact the speed of these devices. If the switching gate capacitances increase, the speed limitations are dictated by the driving electronic components. On the other hand, long transport paths increase the time required for the photo-generated charges to reach storage.

WO 2007/045108 A1 presents a newer TOF sensor example. Here, the drift field over most or all of the photosensitive area is basically static in time. The static or quasi static field in the photosensitive region moves or the dumps the charge carriers into a typically smaller modulated region, which may or may not be photosensitive. The charge carriers are then swept from the modulated region into integration regions or gates synchronously with the modulated signal. This newer system can operate at much higher frequencies because modulation is over a much smaller area, having a lower intrinsic capacitance, whereas transport within the large photosensitive region can be optimized for speed. The newer demodulation device avoids trade-offs between the sensitivity/fill-factor and the demodulation speed. Both aspects can be optimized in the pixel at the same time.

U.S. Pat. No. 6,483,094B1 presents another technology to measure the time of flight. The invention consists of a solid state optical shutter device to demodulate the received light and therefore, in combination with a conventional imager, is able to resolve the TOF information. The optical shutter is placed in front of the imager. It consists of a photodiode as input and a light emitting diode as output. The gate in the photodiode and the light emitting diode can be controlled to enable/disable the electron transfer from the photodiode to the LED. This allows a high-speed demodulation of the received modulated light, hence gathering TOF information.

In all of these designs, synchronization is critical between the modulated illuminating radiation and the sensor sampling or the optical shutter demodulation respectively. Measuring distances based on the TOF require extremely high timing stability for all components: modulated light source, image sensor, and the control circuitry. Temperature changes and component aging, however, result in small timing shifts in operation of the modulated light source, image sensor and driving control circuitry.

SUMMARY OF THE INVENTION

In the past, in single point distance measurement devices, this problem of synchronization and calibration has usually been solved by using references inside the device or by feeding back part of the light from the modulated light source to a second receiver. However, single point distance measurement devices in general only consist of one single light element illumination unit. Hence, only part of the light from this single light element has to be fed back to the receiver as calibration measurement.

In 3-D imaging systems, however, the illumination unit usually includes an array of several, even hundreds of, light elements, such as light emitting diodes or laser diode elements. In this case, simply feeding back part of the light from one element of the modulated light source is usually inadequate since the other light elements might behave differently. The light elements might have different temperature behaviors, manufacturing tolerances in speed, different life time changes, for example. In this case, the back-reflected light derived from one single light element does not necessarily represent the overall emitted light wavefront generated by the array of light elements of the modulated light source.

Furthermore, if the back-reflected light is fed on a reference receiver separate from the main image sensor, it also suffers from different behaviors, e.g. over temperature, lifetime, manufacturing tolerances, than the main receiver itself. It is desirable to have the reference receiver on the same chip and have exactly the same control circuitry as the pixels on the image sensor themselves.

Further, in order to improve S/N ratio, it is desirable to have not only one but several or even hundreds or thousands of reference pixels implemented for averaging.

Additionally, if an optical feedback is implemented in the camera, the light power guided through a light guide back onto reference pixels of the image sensor is constant. However, the pixels used for image sensing in the image sensor get different light power back depending on the scene since changes in distance and reflectivity affect the light power received back to the image sensor. Therefore, for different applications/scenarios the exposure time is adjusted to optimize the signal to noise (S/N) level on the image sensor.

It is desirable that the reference pixels have the same exposure time as the pixels that are used for image sensing. However, in that case, by changing the exposure time, the energy captured by the reference pixels varies, which in some cases can push the reference pixels into saturation for high exposure times or the S/N ratio on the reference pixels is too low for evaluation in the case of for very short exposure times.

In general, according to one aspect, the invention features a demodulation sensor, such as a time of flight sensor. The sensor comprises an illumination module to generate modulated light for illuminating a scene, one or more imaging pixels for detecting the modulated light returning from the scene, and an array of reference pixels in a reference pixels array for receiving reference modulated light from the illumination module. The reference pixels in the reference pixel array have different sensitivities to the reference modulated light from the illumination module. A controller determines a phase relationship between the modulated light generated by the illumination module by reference to the reference pixels and the modulated light detected by the one or more imaging pixels.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Many applications require the measurement of phase delays between an optical signal and an electronic reference signal. Some examples are three-dimensional (3D) range measurement, fluorescence imaging, or optical communication.

In the first example of three-dimensional imaging, the acquisition of the distance information is accomplished by the measurement of the time-of-flight (TOF). That is the time the light needs for the round-trip from the measurement camera or sensor system to the object and back again to the system.

Figure 1:
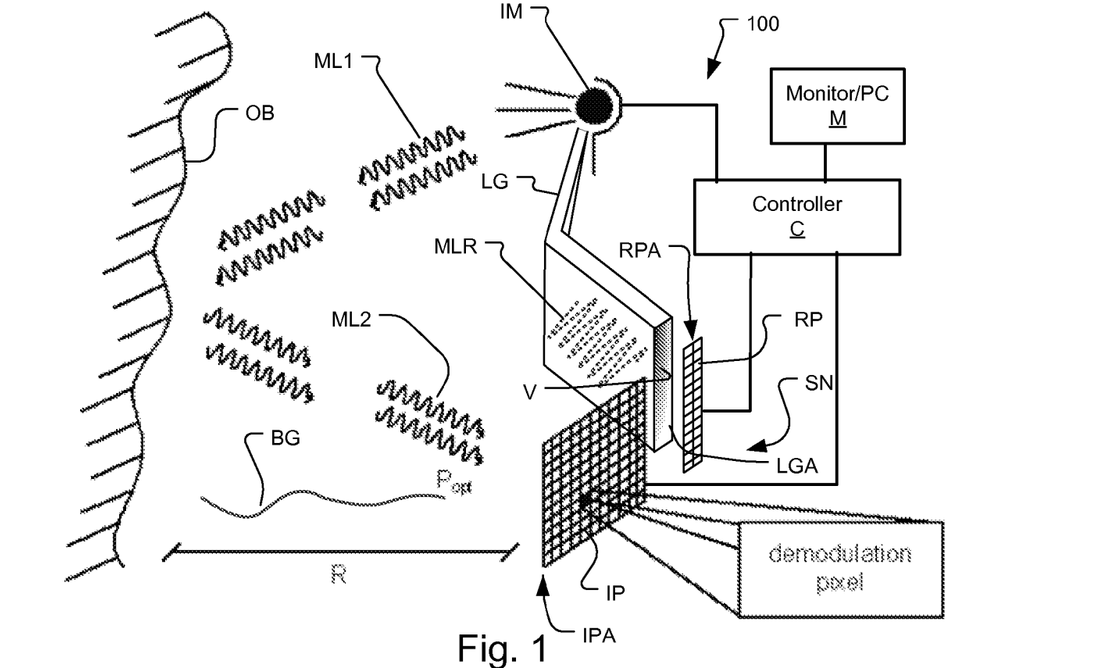
FIG. 1 shows a principle scheme of the three-dimensional-measurement set-up using a sensor comprising demodulation pixel.

FIG. 1 illustrates the basic principle of such a 3D-measurement system.

Modulated light ML1 from a light source or illumination module IM of a camera or sensor 100 is sent to the object OB of a scene. A fraction of the total optical power sent out returns as reflected modulated light ML2 to the camera 100 and detected by the image sensor SN. The sensor SN comprises a single pixel (point ranging) or a pixel matrix IPA comprised of a one or two dimensional array of demodulation imaging pixels IP. Each imaging pixel IP is capable of demodulating the impinging light signal, which also includes any background light BG. A controller C regulates the timing of the camera 100. The phase values of each imaging pixel IP correspond to the particular distance information of one point in the scene. The entire imaging pixel array IPA is read out and displayed for example on a monitor/personal computer M.

The distance R is calculated by $$R = (c \ast TOF)/2,$$

with c as light velocity and TOF corresponding to the time-of-flight. Either pulse intensity-modulated, continuously intensity-modulated light (e.g. sine wave or other modulation codes like pseudo-random sequences) is sent out by the illumination module or light source IM, reflected by the object OB and detected by the sensor SN. If each imaging pixel IP of the sensor SN is capable of demodulating the optical signal at the same time, the sensor SN is able to deliver 3D images in real-time, i.e., frame rates of up to 30 Hertz (Hz), or even more, are possible. In pulse operation the demodulation would deliver the time of flight directly. However, continuous sine-modulation delivers the phase delay (P) between the emitted signal ML1 and the received signal ML2 at the sensor SN, also corresponding directly to the distance R:

$$R=(P*c)/(4*pi*fmod),$$

where fmod is the modulation frequency of the optical signal.

Figure 2A:
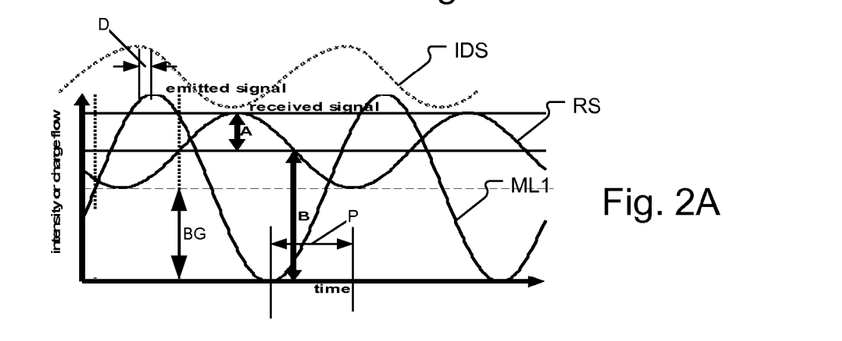
FIGS. 2A and 2B are plots representing the optical intensity and the charge flow as a function of the time for the emitted signal and the received signal, respectively, using the scheme of FIG. 1.
Figure 2B:
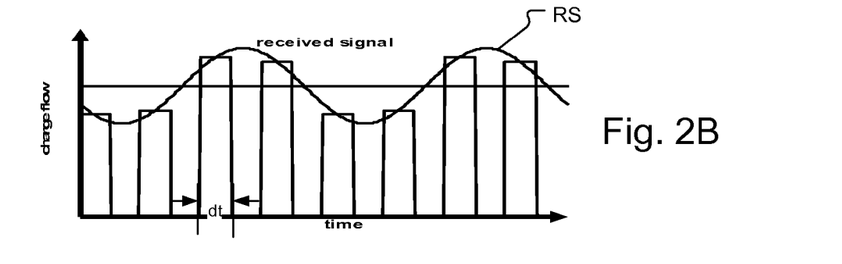

FIGS. 2A and 2B show the relationship between signals for the case of continuous sinusoidal modulation and the signal sampling. Although this specific modulation scheme is highlighted in the following, the utilization of the synchronization is not restricted to this particular scheme. Any other modulation scheme is applicable: e.g. pulse, rectangular, pseudo-noise or chirp modulation. Only the final extraction of the distance information is different.

FIG. 2A shows both the modulated emitted signal ML1 and signal RS received by the sensor SN. Signal RS includes the reflected portion of the emitted signal ML2 and background light BG. The amplitude A corresponds to MS2, and offset B corresponds to the background in the received signal RS. The phase offset P between both signals, ML1, RS, is unknown, but it can be unambiguously reconstructed by sampling the received signal RS.

A further unknown is the phase offset error D between the illumination drive signal IDS produced by the controller C and the modulated emitted signal ML1. This error corresponds to any other delays associated with generation of the emitted signal ML1 and timing and/or sampling of the imaging sensor SN.

As shown in FIG. 2B, a sampling with four samples per modulation period is depicted. Each sample is an integration of the electrical signal over a duration dt that is a predefined fraction of the modulation period. In order to increase the signal to noise ratio of each sample the photo-generated charges are accumulated over several modulation periods, in some embodiments.

By modulating drift fields within of demodulation regions of pixels alternately the photogenerated charge injected into the demodulation regions and spread out below the complete gate structure is forced to drift or diffuse to the specific integration gates and storage site. The alternation of the channel activation is done synchronously with the sampling frequency.

The controller C generates the signals for the synchronous drift field control in the pixels of the sensor SN. Injected charge carriers are moved to the corresponding integration regions. As example, only two integration regions are implemented in the demodulation region. Assuming there is no background light BG (i.e. A=B), then two samples A0 and A1 of the modulation signal sampled at times that differ by half of the modulation period, allowing the calculation of the phase P and the amplitude A of a sinusoidal intensity modulated and offset-free current injected into the sampling stage. The equations look as follows:

$$A=(A0+A1)/2$$

$$P=\arcsin[(A0-A1)/(A0+A1)].$$

Extending the example to four conduction channels and sample values requires in practice a different gate structure of the demodulation region with four contacts and four integration regions or gates and an appropriate clocking scheme for the electrode voltages in order to obtain four sample values A0, A1, A2 and A3 of the injected current. Generally the samples are the result of the integration of injected charge carriers over many quarters of the modulation period, whereby finally each sample corresponds to a multiple of one quarter of the modulation period. The phase shift between two subsequent samples is 90 degree.

Using these four samples, the three decisive modulation parameters amplitude A, offset B and phase shift P of the modulation signal can be extracted by the equations $$A=sqrt[(A3-A1)2+(A2-A1)2]/2$$

$$B=[A0+A1+A2+A3]/4$$

$$P=\arctan\ [(A3-A1)/(A0-A2)]$$

Returning to FIG. 1, a reference pixel array RPA is further provided, according to the principles of the present invention. This reference pixel array RPA receives light directly from the illumination module IM. In the illustrated example, a light guide LG is provided for transmitting reference modulation light MLR to the reference pixel array RPA.

According to the invention, the sensitivity of the reference pixel array RPA to the reference modulated light MLR is varied for different reference pixels RP of the reference pixel array RPA as illustrated by shading V. In one embodiment the different sensitivities of the reference pixels RP in the RPA are achieved by designing the pixels to have different light sensitivities with respect to each other. In another embodiment, the different sensitivities are achieved by changing the optical coupling between the separate reference pixels RP of the reference pixel array RPA to the reference modulated light MLR such as by changing how the different reference pixels RP couple to the aperture LGA of the light guide LG.

Figure 3:
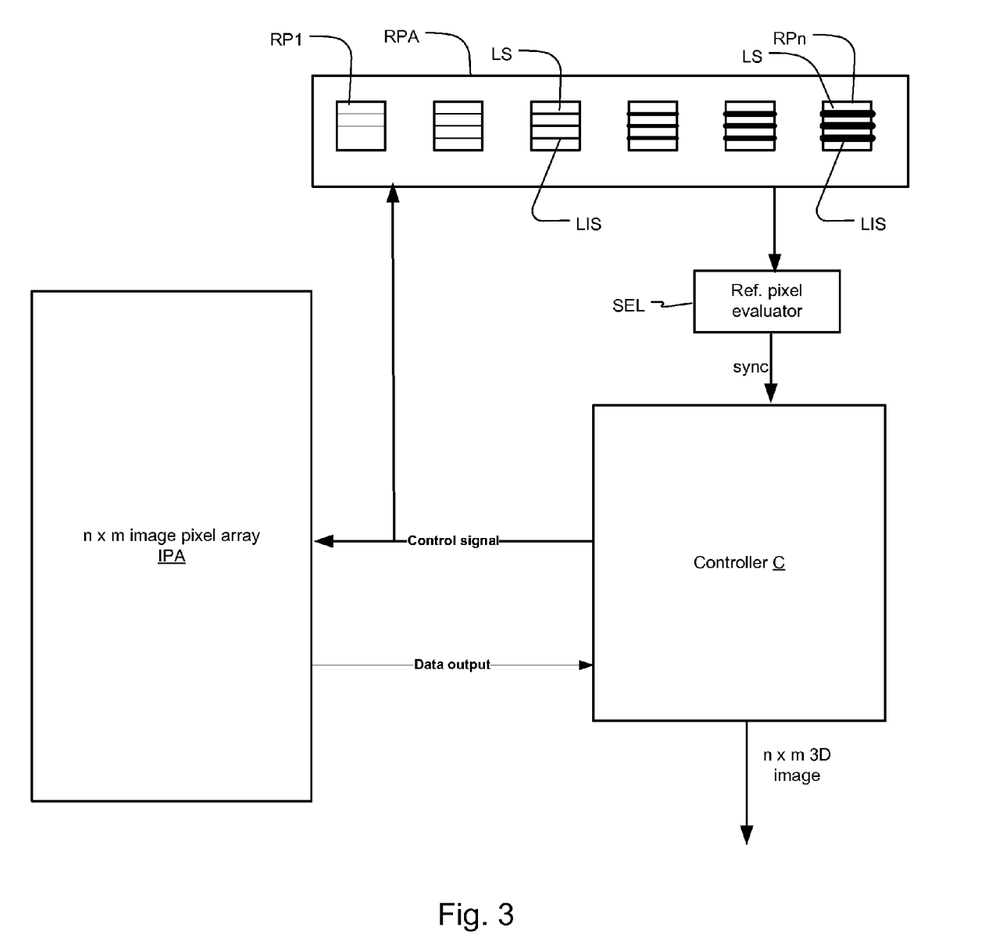
FIG. 3 is a block diagram illustrating the relationship between the imaging pixel array, the reference pixel array, and controller, according to the invention.

FIG. 3 illustrates the relationship between the imaging pixel array IPA, the reference pixel array RPA and controller C. The controller C reads out the image information and time of flight information from the imaging pixel array IPA. In order to analyze the time of flight information, the controller receives a sync signal generated by a reference pixel evaluator SEL.

The reference pixel array RPA comprises a series of reference pixels RP1-RPn. According to one embodiment of the invention, the reference pixel array RPA comprises pixels RP1-RPn that have varying degrees of light sensitive LS and light insensitive LIS regions. Specifically, in the illustrated example, the proportion of the light sensitive LS to light insensitive LIS regions for the pixels RP1-RPn increases across the lateral extent of the reference pixel array RPA.

The reference pixel evaluator SEL generates the sync signal to the controller C based on information from selected pixels within the reference pixel array RPA. This sync signal provides a "zero distance" value, which is used to calibrate the phase measurements of all image pixels. The reference pixel evaluator SEL selects one pixel or weights and averages multiple pixels of the reference pixel array RPA based on whether the pixels are receiving an adequate signal but are not in saturation. As indicated in FIG. 3, it is desired that the control signals supplied by the controller C are exactly the same for the image pixel array IPA and for the reference pixel array RPA. In this way, the reference pixel array RPA is controlled with the same exposure time as the imaging pixel array IPA. Nevertheless, due to different sensitivities in the reference pixel array RPA, pixels are always available for use by the evaluator SEL due to the different sensitivities provided in the RPA.

Figure 4:
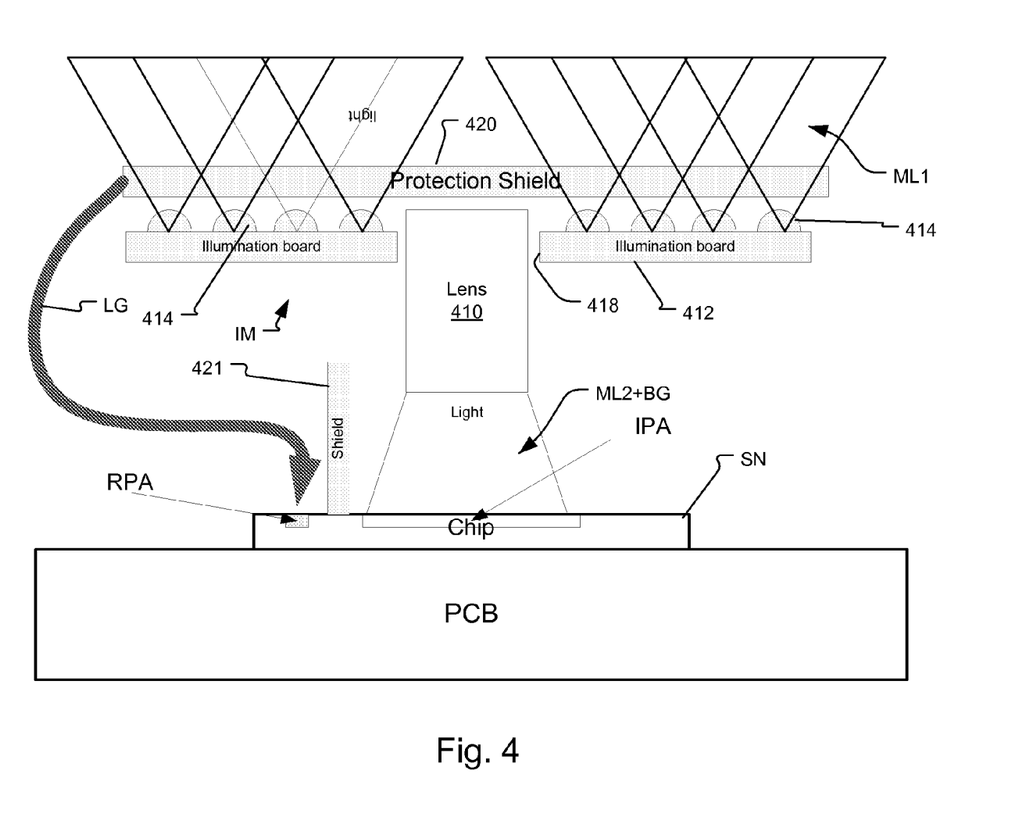
FIG. 4 is a schematic diagram illustrating the arrangement of the camera 100, according to the invention.

FIG. 4 illustrates the arrangement of the camera 100. The imaging module IM comprises an illumination board 412. This illumination board 412 in turn comprises a series of light elements 414. In a preferred embodiment, theses light elements 414 are light emitting diodes and/or laser diodes. A protection shield 420 separates the illumination module IM from the external environment. This protection shield 420 is often transparent only to the light of the wavelength generated by the light emitting elements 414. Most of the modulated light generated by the illumination module IM and passing through the protection shield 420 is the modulated light transmitted to the scene or object of interest (ML1). A portion of the light is transmitted by internal reflection, for example, as reference modulated light MLR to the light guide LG that is attached to a lateral side of the protection shield 420, in the illustrated implementation. The light guide LG carries the reference light MLR to the reference pixel array RPA on the sensor chip SN.

In the illustrated example, the reference pixel array RPA is located laterally to and on the same chip with the image pixel array IPA. A light shield 421 projects vertically from the sensor SN to prevent light from the light guide LG from reaching the pixels of the imaging pixel array IPA. In this way, the imaging pixel array IPA is sensitive largely or only to the light returning from the scene ML2+BG. Specifically, the light returning from the field in the illustrated example is received through the protection shield 420. A lens array 410 is located in a central port 418 in the illumination board 412. This central lens system 410 focuses the returning light ML2+BG onto the imaging pixel array IPA.

Figure 5A:
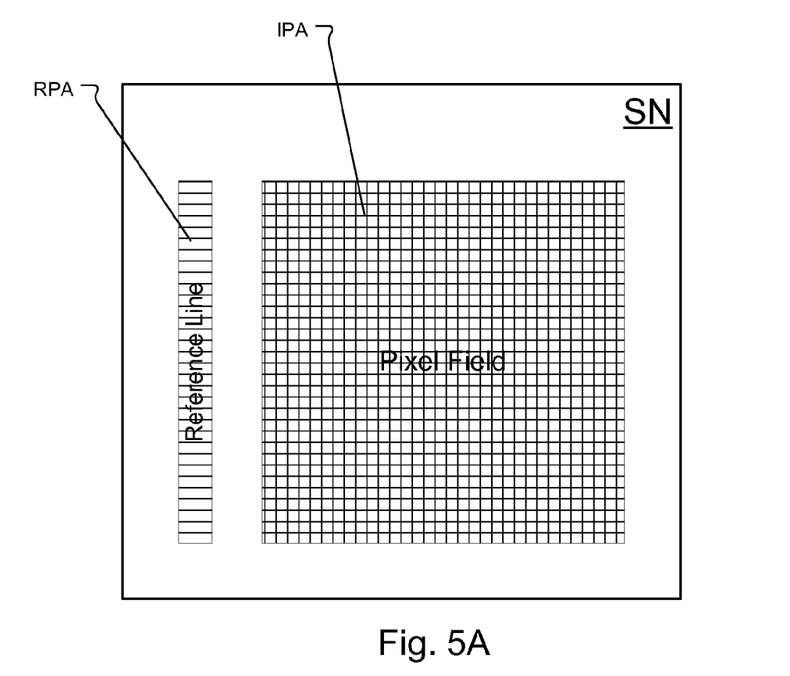
FIGS. 5A and 5B are schematic diagrams illustrating the relationship between the reference pixel array and the imaging pixel array, according to the invention.
Figure 5B:
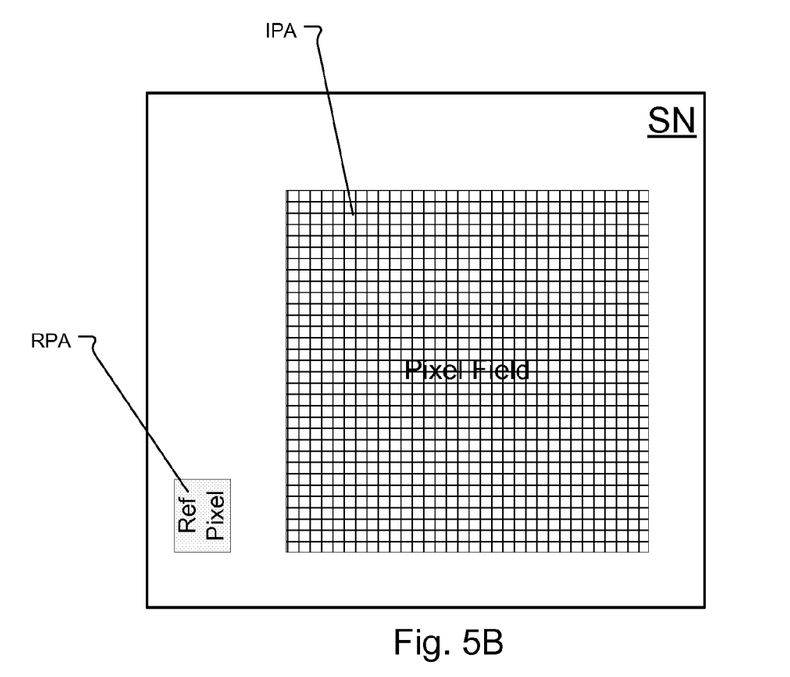

FIGS. 5A and 5B are schematic diagrams illustrating the relationship between the reference pixel array RPA and the imaging pixel array IPA according to two implementations.

FIG. 5A shows a first implementation of the reference pixel array RPA and its relationship to the imaging pixel array IPA. The reference pixel array RPA is a line having only a single pixel width or multiple pixel width. It extends over an entire length of the imaging pixel array IPA. In this way, every line and/or every row of the imaging pixel array has a corresponding pixel in the reference pixel array RPA on the sensor chip SN. Preferably, the reference pixel array is controlled by exactly the same signals as the imaging pixel array (IPA).

FIG. 5B shows a second implementation of the sensor chip SN. In this implementation, the reference pixel array RPA comprises a square or rectangular field that is adjacent to and smaller than the imaging pixel array IPA. It does not extend over the entire row or column of the imaging pixel field array IPA. Preferably it comprises a series of pixels in a two-dimensional array.

Figure 6:
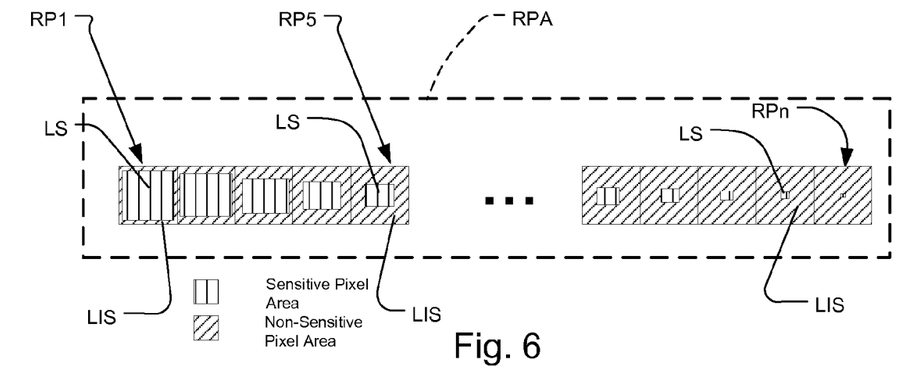
FIG. 6 is a schematic diagram illustrating the relationship between the sensitive pixel and non-sensitive pixel area in the reference pixel array, according to the invention.

FIG. 6 shows how the sensitive area LS and non-sensitive area LIS changes across the extent of the reference pixel array RPA. In the illustrated embodiment, the light pixel RP1 at one extreme end of the reference pixel array RPA has a large light sensitive region LS in relationship to the light insensitive region LIS of the reference pixel. Reference pixel RP5, near to the center of the reference pixel array RPA has a much larger light insensitive region LIS relative to light sensitive region LS; whereas at the other extreme of the reference pixel array RPA, the light insensitive region LIS is very large in respect to the light sensitive region LS.

Figure 7:
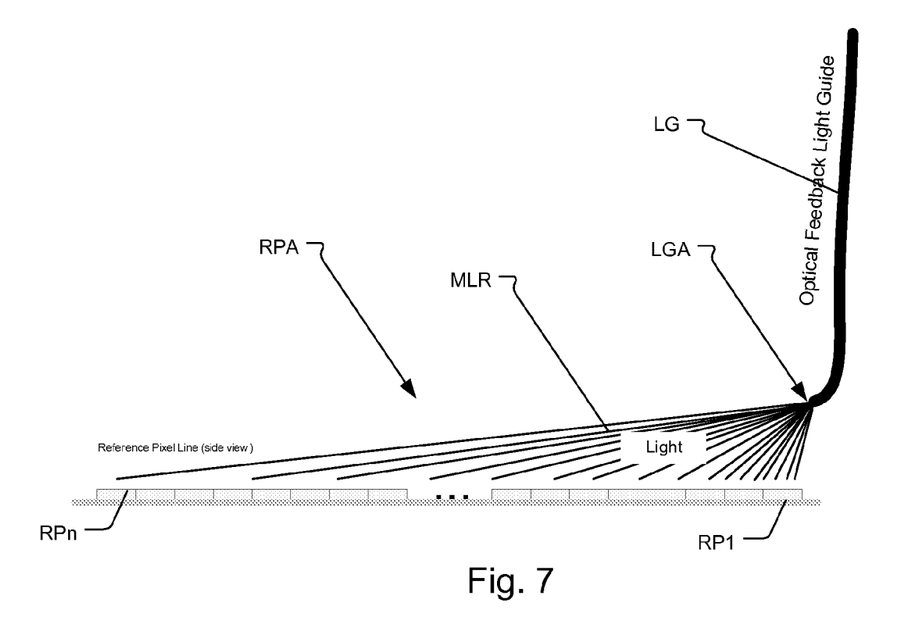
FIG. 7 is a schematic diagram illustrating the relationship between the reference pixel array and light guide according to another embodiment of the invention.

FIG. 7 illustrates another embodiment. In this embodiment, all of the pixels of the reference pixel array RPA can have the same inherent sensitivity to the light in one example, although this is not required. Specifically, they all would typically have the same proportion of light insensitive to light sensitive regions across the extent of the reference pixel array RPA.

In this embodiment, sensitivity of the reference pixel array RPA to the reference modulated light MLR is varied for different reference pixels RP of the reference pixel array RPA by changing how light guide LG is coupled to across the length of the reference pixel array RPA. In this way, reference pixel RP1 that is closer to the light guide aperture LGA, receives more light than reference pixels RPn that are farther from this aperture. In this way, the reference pixels will be available that will not be in saturation even as the level of the reference modulated light MLR changes or the integration periods or exposure times change.

While this invention has been particularly shown and described with references to preferred embodiments thereof, it will be understood by those skilled in the art that various changes in form and details may be made therein without departing from the scope of the invention encompassed by the appended claims.

What is claimed is:

1. A demodulation sensor, comprising:
    an illumination module for generated modulated light for illuminating a scene;
    one or more imaging pixels for detecting the modulated light returning from the scene;
    an array of reference pixels in a reference pixel array for receiving reference modulated light from the illumination module, wherein the reference pixels in the reference pixel array have different sensitivities to the reference modulated light from the illumination module; and
    a controller for determining a phase relationship between the modulated light generated by the illumination module with reference to the reference pixel array and the modulated light detected by the one or more imaging pixels.

2. A sensor as claimed in claim 1, wherein the one or more imaging pixels comprises a single pixel for point ranging.

3. A sensor as claimed in claim 1, wherein the one or more imaging pixels comprises a one or two dimensional array of imaging pixels for generating an image of the scene.

4. A sensor as claimed in claim 1, wherein the array of reference pixels comprises a one or two dimensional array of reference pixels on a same chip as the one or more imaging pixels and adjacent to the imaging pixels.

5. A sensor as claimed in claim 4, further comprising a light shield projecting from the chip between the reference pixels and the one or more imaging pixels to prevent the reference light from reaching the one or more imaging pixels.

6. A sensor as claimed in claim 1, wherein the reference light is transmitted from the illumination module to the reference pixel array in a light guide.

7. A sensor as claimed in claim 6, wherein reference pixels of the reference pixel array have different sensitivities to the reference modulated light from the illumination module due to different coupling to the light guide.

8. A sensor as claimed in claim 1, wherein reference pixels of the reference pixel array have different sensitivities to the reference modulated light from the illumination module due to different optical sensitivities.

9. A sensor as claimed in claim 1, wherein reference pixels of the reference pixel array have different sensitivities to the reference modulated light from the illumination module due to different proportions of light sensitive and light insensitive regions in the pixels.

10. A sensor as claimed in claim 1, further comprising a reference pixel evaluator for generating a synchronizing signal to the controller in response to selected pixels in the reference pixel array.

11. A sensor as claimed in claim 1, further comprising a reference pixel evaluator that generates a synchronizing signal to the controller in response pixels selected from the reference pixel array based on 1) which of the pixels are saturated or not and 2) which of the pixels have a good S/N or not.

12. A sensor as claimed in claim 1, further comprising a reference pixel evaluator that generates a synchronizing signal to the controller in response pixels selected from the reference pixel array based on averaging and/or weighting a phase reference based on one or more of the reference pixels in the reference pixel array.

13. A demodulation method, comprising:
generating modulated light for illuminating a scene;
detecting the modulated light returning from the scene to produce a three dimensional image of the scene;
receiving and detecting reference modulated light with a reference pixel array of reference pixels having different sensitivities to the reference modulated light; and
determining a phase relationship between the modulated light and the detected modulated light returning from the scene with reference to the reference pixel array.

14. A method as claimed in claim 13, further comprising preventing the reference modulated light from reaching imaging pixels.

15. A method as claimed in claim 13, wherein reference pixels of the reference pixel array have different sensitivities to the reference modulated light due to different coupling to a light guide.

16. A method as claimed in claim 13, wherein reference pixels of the reference pixel array have different sensitivities to the reference modulated light due to different optical sensitivities.

17. A method as claimed in claim 13, wherein reference pixels of the reference pixel array have different sensitivities to the reference modulated light due to different proportions of light sensitive and light insensitive regions in the pixels.

18. A method as claimed in claim 13, wherein the step of determining the phase relationship comprises selecting pixels from the reference pixel array and generating a synchronizing signal from the selected pixels.

19. A method as claimed in claim 13, wherein the step of determining the phase relationship comprises selecting pixels from the reference pixel array and generating a synchronizing signal from the selected pixels by averaging or weighting the pixels.

20. A demodulation sensor, comprising:
an illumination module for generated modulated light for illuminating a scene;
one or more imaging pixels for detecting the modulated light returning from the scene;
an array of reference pixels in a reference pixel array for receiving reference modulated light from the illumination module;
a controller for determining a phase relationship between the modulated light generated by the illumination module with reference to the reference pixel array and the modulated light detected by the one or more imaging pixels
a reference pixel evaluator that generates a synchronizing signal to the controller in response pixels selected from the reference pixel array based on averaging and/or weighting a phase reference based on one or more of the reference pixels in the reference pixel array.

* * * * *